(12) United States Patent
Landrieve et al.

(10) Patent No.: US 7,033,080 B2
(45) Date of Patent: Apr. 25, 2006

(54) DEVICE FOR DETECTING THE ROTATION SPEED OF A ROTATING ELEMENT

(75) Inventors: Franck Landrieve, Fondettes (FR); Olivier Verbe, Tours (FR)

(73) Assignee: Aktiebolaget SKF, Göteborg (SE)

(*) Notice: Subject to any disclaimer, the term of this patent is extended or adjusted under 35 U.S.C. 154(b) by 89 days.

(21) Appl. No.: 10/467,404

(22) PCT Filed: Jan. 30, 2002

(86) PCT No.: PCT/FR02/00359

§ 371 (c)(1),
(2), (4) Date: Feb. 26, 2004

(87) PCT Pub. No.: WO02/063311

PCT Pub. Date: Aug. 15, 2002

(65) Prior Publication Data

US 2004/0141669 A1    Jul. 22, 2004

(30) Foreign Application Priority Data

Feb. 2, 2001    (FR) .................................. 01 01436
Oct. 23, 2001   (FR) .................................. 01 13683

(51) Int. Cl.
*F16C 33/78* (2006.01)

(52) U.S. Cl. ............................ 384/448; 384/446
(58) Field of Classification Search ............ 384/448, 384/484, 543; 324/174
See application file for complete search history.

(56) References Cited

U.S. PATENT DOCUMENTS

| 4,946,295 | A | 8/1990 | Hajzler |
| 5,018,384 | A | 5/1991 | Hayashi et al. |
| 5,575,568 | A | 11/1996 | Rigaux et al. |
| 5,713,577 | A | 2/1998 | Lannert et al. |
| 6,011,491 | A | 1/2000 | Goetzl |
| 6,043,643 | A | 3/2000 | Message et al. |
| 6,109,624 | A | 8/2000 | Message et al. |
| 6,338,576 | B1 | 1/2002 | Girardin et al. |
| 6,611,138 | B1 | 8/2003 | Vasiloiu |
| 2004/0013334 | A1 | 1/2004 | Landrieve et al. |
| 2004/0154895 | A1 | 8/2004 | Thomire et al. |
| 2004/0202392 | A1 | 10/2004 | Niarfeix et al. |

FOREIGN PATENT DOCUMENTS

| DE | 4228899 | 3/1994 |
| DE | 9418459 | 2/1995 |

(Continued)

OTHER PUBLICATIONS

International Search Report for PCT/FR02/00359 mailed Jul. 3, 2002.

(Continued)

*Primary Examiner*—Lenard A. Footland
(74) *Attorney, Agent, or Firm*—Meyertons, Hood, Kivlin, Kowert & Goetzel, P.C.; Eric B. Meyertons (57) ABSTRACT

The invention relates to a device for detecting the rotation speed of a rotating element supported by at least one external rotating ring with at least one roller bearing. At least one internal non-rotating ring of the roller bearing is solidly connected to a shaft mounted on a support. The inventive device includes a non-rotating sensor adjacent to the roller bearing and a rotating encoder. The encoder is at least partially fixed by magnetization to a flange which is integral to the rotating ring and which is made from a magnetizable material.

42 Claims, 8 Drawing Sheets

FOREIGN PATENT DOCUMENTS

| | | |
|---|---|---|
| DE | 10011820 | 9/2001 |
| EP | 0 511 105 | 10/1992 |
| EP | 0520853 | 12/1992 |
| EP | 0553716 | 8/1993 |
| EP | 0 930 505 | 7/1999 |
| EP | 0 992 797 | 4/2000 |
| EP | 1164358 | 12/2001 |
| EP | 1037051 | 9/2004 |
| FR | 2602872 | 2/1988 |
| FR | 2655735 | 6/1991 |
| FR | 2754903 | 4/1998 |
| FR | 2813644 | 3/2002 |
| GB | 2153082 | 8/1985 |
| WO | 02052163 | 7/2002 |
| WO | WO 02/052280 | 7/2002 |
| WO | 03065051 | 8/2003 |
| WO | 2004005937 | 1/2004 |

OTHER PUBLICATIONS

French Search Report for FR 0302363 mailed Oct. 6, 2003.

Allan, Roger, "Coil-Based Micromachined Sensor Measures Speed and-Position for Automotive Applications", Electronic Design, Penton Publishing, Cleveland, OH, US, vol. 44, No. 26, Dec. 16, 1996, pp. 34, 35, and 37.

Rapport D'Examen Preliminaire International for PCT/FR03/00264, Date d'achevement du present rapport Jul. 28, 2003 (5 pages).

Rapport D'Examen Preliminaire International for PCT/FR03/01985, Date d'achevement du present rapport Dec. 9, 2004 (7 pages).

DEVICE FOR DETECTING THE ROTATION SPEED OF A ROTATING ELEMENT

BACKGROUND OF THE INVENTION

1. Field of the Invention

This invention relates to detection of the rotation speed of a rotating element and can be used in roller skates, skateboards, bicycles, or scooters, in which a device for detection of wheel rotation is provided.

2. Description of the Related Art

In general, wheels of in-line roller skates are mounted one behind the other on the side plates of a support fixed to a shoe. Each wheel is free to rotate about a fixed spindle through two roller bearings with the ends of the said spindle fixed to the support plates. Skates with coaxial wheels and skateboards are also known.

Document FR-A-2 772 920 describes a device for detection of the rotation speed of a wheel on an in-line skate where the wheel is supported by rotating rings of two roller bearings with the fixed rings of the two roller bearings fixed to a spindle mounted on a support. The detection device includes a sensor and an encoder placed in a volume delimited in the axial direction by two roller bearings and in the radial direction by the reaming in the wheel. This type of assembly is usually satisfactory. However, it is desirable to be able to easily equip one of the wheels of a skate using a conversion kit where the conversion may be performed by a simple addition without any particular machining or reworking of existing parts.

SUMMARY OF THE INVENTION

The invention is designed to facilitate mounting of a sensor/encoder assembly in a roller bearing, particularly a roller bearing of an in-line skate, skateboard, scooter, etc. The invention is advantageously applicable to other applications to enable easy assembly of an encoder on a rotating part.

The invention proposes a device for detection of the rotation speed in which the elements comprising the sensor means and the encoder means are substituted for the original elements or are installed on the original elements without the need to make any modifications to the rotating element or to the original parts remaining in the rotating element assembly.

According to one embodiment of the invention, the device for detection of the rotation speed is designed to be used on a rotating element of the type supported by at least one external rotating ring with at least one roller bearing, with at least one non-rotating inner ring of the roller bearing fixed to a spindle installed on a support. The device includes a non-rotating sensor adjacent to the roller bearing and a rotating encoder. The encoder is at least partly fixed by magnetization onto a side plate fixed to the rotating ring and is made from a magnetizable material. The encoder includes at least one magnet extending over part of the side plate at a fixed location in the radial and circumferential directions in the immediate vicinity of one face of the side plate facing the sensor such that the attraction force between the magnet and the side plate participates in holding the said encoder in contact with the said side plate.

An adhesive means may also be arranged between the face of the side plate and the encoder.

The side plate may be a sealed side plate installed in an annular groove of the rotating ring and extending close to the non-rotating ring.

In one embodiment of the invention, the rotating element is supported by rotating outer rings of two roller bearings. Non-rotating inner rings of the two roller bearings are fixed to a spindle installed on a support. The detection device includes a sensor and an encoder arranged in a volume delimited in the axial direction by two roller bearings and in the radial direction by a cylindrical surface coaxial with the roller bearings and with a diameter equal to the outside diameters of the outer rings of the roller bearings. The detection device may easily be adapted to a standard in-line skate, on which there was no previous detection means, simply by interchanging elements or by installing additional elements without requiring any modification to the original parts of the skate. Therefore, it is very easy to use the detection device.

In one embodiment, the magnet is in contact with the side plate. The magnet may be bonded onto the side plate. The magnet may be embedded in an annular support. The annular support may be in contact with the side plate. The annular support may be bonded onto the side plate. The magnet is a permanent magnet and is in the form of a disk or a wafer made by sintering of powder components. For example, samarium cobalt (SmCo) magnets could be used in order to make a compact magnet with strong magnetic properties.

In one embodiment, the annular support is made of a flexible material.

In one embodiment, the annular support is centered on the wheel.

In one embodiment, the outside diameter of the annular support is slightly greater than the reaming of the wheel.

The annular support may be centered on a portion of the side plate.

In one embodiment, the encoder includes an active encoding part and a magnetization part formed from the same material.

In one embodiment, the encoder is formed from locally magnetized plastoferrite.

Advantageously, the magnet is housed in a compartment. The compartment may be made by insert moulding of a flexible material on the outside face of the side plate.

In one embodiment, the compartment has a parallelepiped shape.

The walls of the compartment may be approximately perpendicular to a radial plane. Preferably, the walls of the compartment include a part that flares outwards to form an entry chamfer, a central part acting essentially to retain the magnet, and a reverse tapered part near the bottom of the compartment.

In one embodiment, the device includes a sealing lip formed from a flexible material.

In one embodiment, the device includes a disk-shaped element made from the said flexible material with an approximately radial outside face of the encoder. The magnet may be flush with the said face or it may be set back from it.

In one embodiment, the disk-shaped element is fixed in a groove in the rotating ring.

In one embodiment, the disk-shaped element has an inside edge forming a dynamic seal between the element and the contact surface of the non-rotating ring, either in friction or with a narrow gap.

In one embodiment, the magnet is held in place in the compartment partly by a magnetic force and partly by a mechanical force due to clamping in the said compartment.

According to one aspect of the invention, a rotation speed detection device is intended for use with a rotating element of the type supported by at least one rotating outer ring with at least one roller bearing with at least one non-rotating inner ring of the roller bearing fixed to a spindle installed on a support. The device includes a non-rotating sensor adjacent to the bearing and a rotating encoder. The encoder is fixed onto a side plate fixed to the rotating ring. The encoder means includes a disk-shaped element provided with at least one compartment and at least one magnet housed in the compartment.

According to one aspect of the invention, an encoder will be used in a device for detection of the rotation speed of a wheel supported by at least one rotating outer ring with at least one roller bearing with at least one non-rotating inner ring of the roller bearing fixed to a spindle installed on a support where the device includes a non-rotating sensor adjacent to the roller bearing. The encoder includes at least a partial magnetization method of attachment to a side plate made of a magnetizable material. The encoder includes at least one magnet extending over part of the side plate placed in the radial direction and in the circumferential direction and placed in the immediate vicinity of one face of the side plate facing the sensor such that the attraction force between the magnet and the side plate participates in retaining the said encoder in contact with the said side plate.

The encoder may include one or several magnets.

According to one aspect of the invention, roller skates with in-line wheels, a skateboard, a scooter, and a bicycle all have more than one wheel. At least one wheel is supported by at least one rotating outer ring with at least one roller bearing and at least one non-rotating inner ring of the roller bearing fixed to a spindle installed on a support. The skate includes a device for detection of the rotation speed of the wheel and includes a non-rotating sensor adjacent to the bearing and a rotating encoder. The encoder is fixed, at least partly by magnetization, on a side plate fixed to the rotating ring and is made of a magnetic material. The encoder includes at least one magnet placed in the immediate vicinity of the face of the side plate facing the sensor such that the attraction force between the magnet and the side plate participates in retaining the said encoder in contact with the said side plate.

A battery or a rotating generator may be provided to power the emitter.

The sensor and the encoder may be placed without changing the structure or original shape of the wheel.

Thus, the result is a skate for which the detection device is particularly well protected against external pollution and shocks and for which the wheels can be replaced while keeping the same detection device that can also be fitted on a skate that did not have one originally.

BRIEF DESCRIPTION OF THE DRAWINGS

This invention will be better understood after reading the detailed description of some embodiments used as examples that are in no way limiting, and are shown on the attached drawings in which.

DETAILED DESCRIPTION OF THE INVENTION

Figure 1:
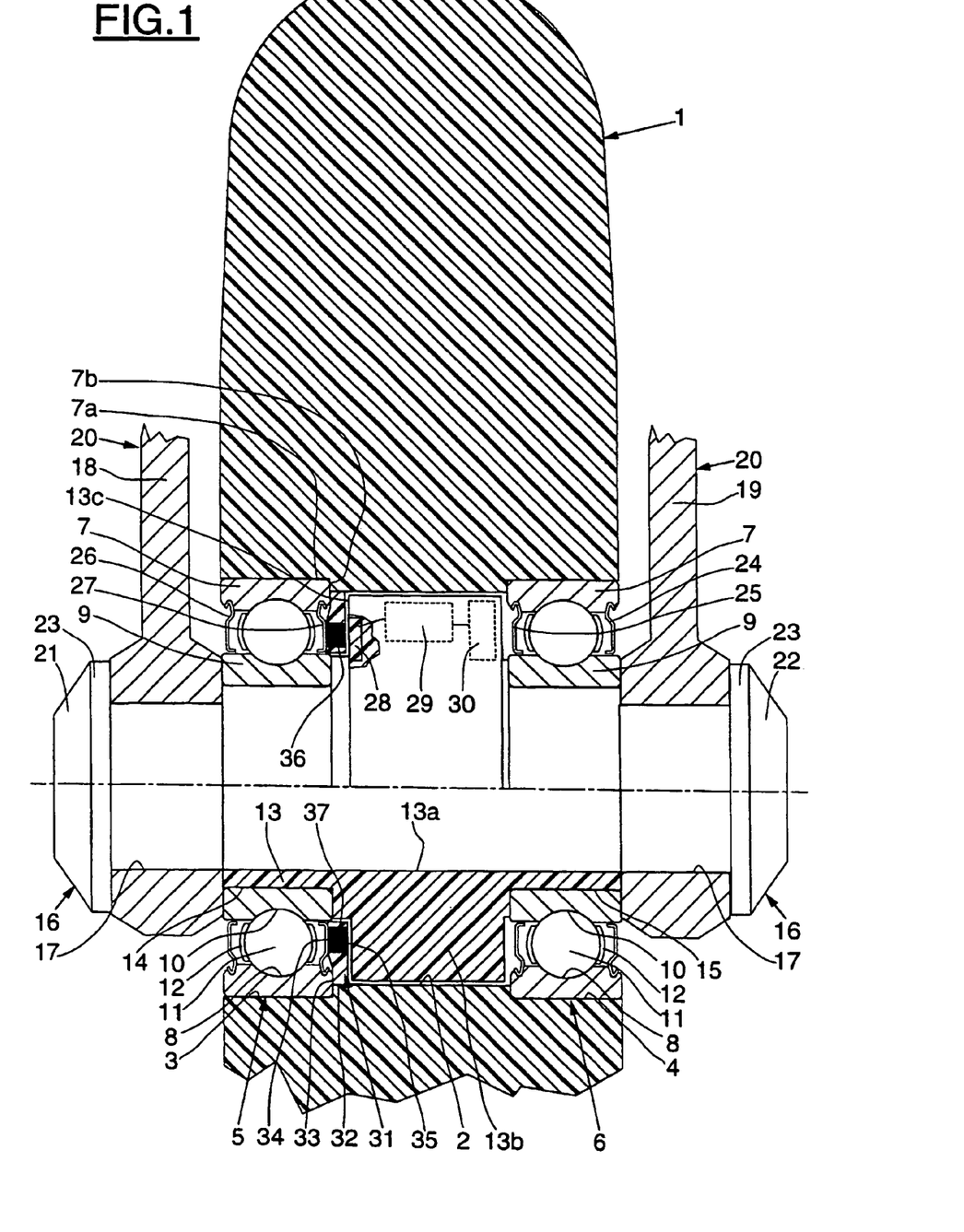
FIG. 1 is an axial sectional view of a wheel of an in-line skate equipped with a detection device according to the invention where the sensor block is shown as an external view in the top part of the figure.

As can be seen in FIG. 1, wheel 1 of an in-line skate is provided with a reaming 2 that is extended by shouldered cylindrical bearing surfaces 3 and 4 at each end for assembly of roller bearings 5 and 6. The two assembly contact surfaces 3 and 4 are concentric with the axis of rotation of the wheel and their diameters, exactly the same, are more than the reaming of wheel 1. Roller bearings 5 and 6 are identical and are provided with a rotating outer ring 7 having rolling track 8, a non-rotating inner ring 9 having rolling track 10, and a row of rollers 11, (e.g., example balls), placed between rolling track 8 and rolling track 10 and kept at a spacing from each other in the circumferential direction by a cage 12.

Outer ring 7 of each roller bearing is installed, using outer cylindrical surface 7a, inside the corresponding cylindrical bearing surface of assembly 3 or 4 of wheel 1.

Wheel 1 is single piece with the reaming 2 and rolling surface 1a forming part of the same part.

Inner rings 9 of roller bearings 5 and 6 are supported by a sleeve-shaped spacer 13 provided with shouldered cylindrical bearing surfaces 14 and 15 at each end for assembly of roller bearings 5 and 6. The spacer 13 is installed on a spindle 16 that projects from both sides of spacer 13 and wheel 1. The portions of the spindle that project from spacer 13 enter the reamings 17 formed in each flange 18 and 19 of support 20. The spindle 16 is held in place on one side by a head 21 and on the other side by a screw 22 that is screwed to the end of spindle 16 and that is provided with a wide head 23 with a diameter greater than the diameter of the reaming 17 of flange 19 of board 20, and that bears on a radial surface of flange 19 thus fixing spindle 16 in position.

Roller bearing 6 is provided with sealing elements on each side of the row of rolling elements 11 in the form of side plates 24 and 25. Sealing side plate 24 is located on the outside while sealing side plate 25 is located on the inside facing roller bearing 5. Roller bearing 5 is also provided with seal packing in the form of outside side plate 26 and inside side plate 27.

Sealing side plates 24 to 27 are made from a sheet blank including a portion in which the corresponding outer ring is fixed in a groove, a radial portion extending inwards, and a short cylindrical portion placed close to an outer cylindrical surface of the corresponding inner ring.

Spacer 13 is made from a synthetic material and is in the shape of a general surface of revolution with thin portions corresponding to cylindrical bearing surfaces 14 and 15 and a thicker central portion 13b extending radially towards the outside close to the reaming 2 of wheel 1 between roller bearings 5 and 6. The reaming 13a of spacer 13 is in contact with the outer surface of spindle 16.

In the central portion 13b that forms a sensor support block, there is a sensor 28, a transmitter 29, and a battery 30 connected by electrical connections. Transmitter 29 and battery 30 are embedded in the synthetic material of the central portion 13b. Sensor 28 is inserted in the said synthetic material while remaining flush with an annular radial surface 13c facing side plate 27 of roller bearing 5.

Figure 2:
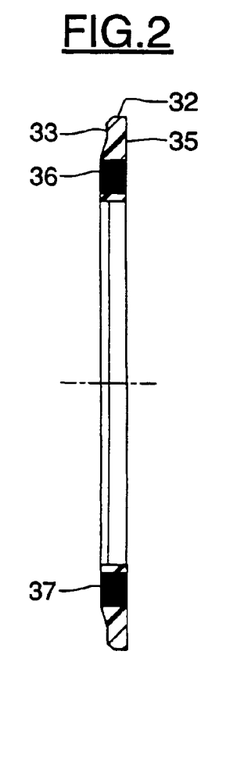
FIG. 2 is an axial sectional view of the encoder of the wheel in FIG. 1.
Figure 3:
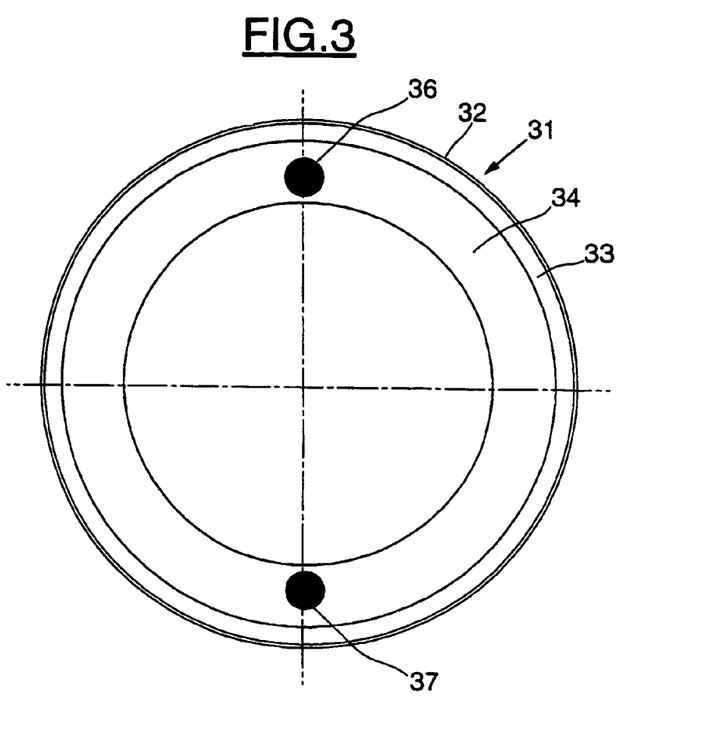
FIG. 3 is an elevation view of the encoder in FIG. 1.

An annular-shaped encoder element 31 is fixed to the radial portion of sealing side plate 27 of roller bearing 5. Encoder element 31 has an external cylindrical surface 32 in contact with the reaming 2 of wheel 1, a radial surface 33 in contact with a corresponding front surface 7b of outer ring 7, a radial surface 34 in contact with the radial portion of sealing side plate 27, and a radial surface 35 placed facing sensor 28 with a small air gap from it.

Encoder element 31 includes two magnets 36 and 37 that are used to fix it onto the radial portion of sealing side plate 27 made from a ferromagnetic plate. Magnets 36 and 37 are embedded in the synthetic material forming encoder element 31 and centered in the reaming 2 of wheel 1 and bearing in contact with the metallic sealing side plate. All that is necessary to equip a standard wheel with a detection device is to place the encoder element, described above, adjacent to the side plate of one of the bearings and to replace the spacer. If the encoder itself is of the magnetic type, a magneto-sensitive sensor such as a Hall effect probe can be used. The active part of the encoder element may be made from a locally magnetized plastoferrite.

The assembly operation is particularly simple. The encoder element is inserted in the reaming of the wheel and brought into contact with the metallic side plate. Since encoder element 31 is centered with respect to the reaming 2 of the wheel, the magnets are perfectly positioned with respect to the side plate in the radial direction. As they come into contact with the side plate, magnets 36 and 37 will create a sufficiently high axial adhesion force to keep the said encoder element in contact with the rotating part of the bearing while the side plate remains fixed to the outer ring 7 with itself fixed to wheel 1. Obviously, the connection between the side plate and the encoder element could be reinforced using an adhesive placed on the radial surface 34 of encoder element 31 and/or by providing a small diametric interference between the outside cylindrical surface 32 of encoder element 31 and the reaming 2 of wheel 1 to reinforce the attachment by a slightly tight insert fit.

Obviously, the encoder element may include a single magnet or it may include more than two magnets. It would also be possible to place unmagnetized devices with identical masses diametrically opposite the magnets to avoid the formation of out-of-balance masses.

Figure 4:
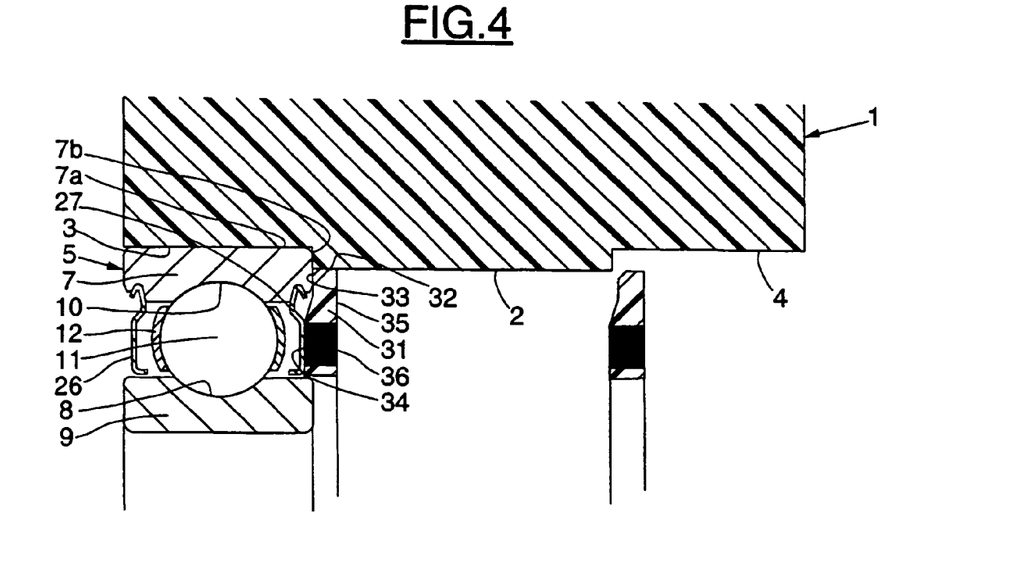
FIG. 4 is a detailed view of FIG. 1 illustrating assembly of the encoder.

FIG. 4 shows how encoder element 31 can be installed on wheel 1 on which roller bearing 5 has already been fitted. After removing the other bearing, an axial movement brings the encoder element into place from the side opposite roller bearing 5. It is made to slide along the reaming 2 of wheel 1 until magnet 36 comes into contact with sealing side plate 27.

Figure 5:
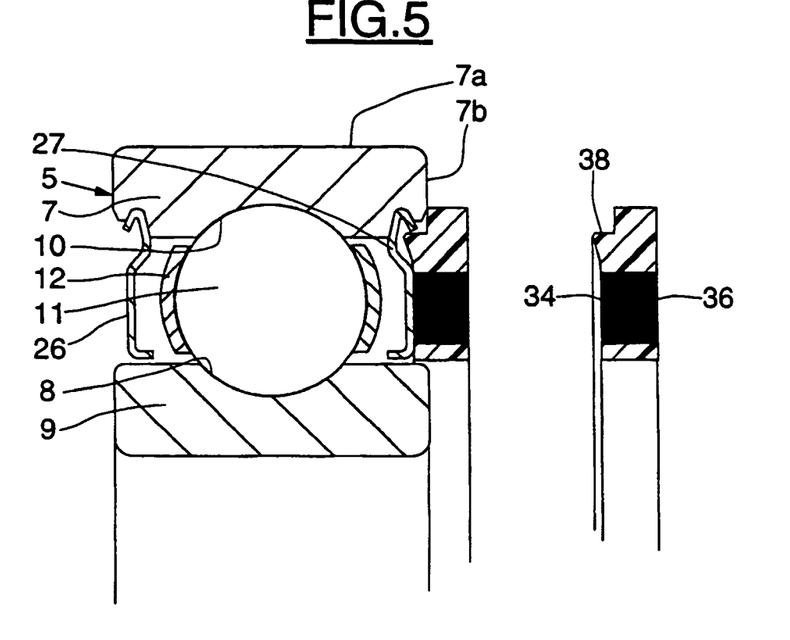
FIG. 5 is an axial sectional view of a bearing according to another embodiment of the invention.

In the embodiment shown in FIG. 5, encoder element 31 is similar to the encoder element of the previous embodiment except that it is provided with a cylindrical centering bearing surface 38 that cooperates with the crimping lip of the side plate that projects from the groove in the side plate support formed in outer ring 9. In this case, the outside diameter of encoder element 31 is smaller than the outside diameter in the previous embodiment and no longer comes into contact with the reaming 2 of wheel 1. On the other hand, as before, radial surface 34 comes into contact with the radial portion of sealing side plate 27.

Figure 6:
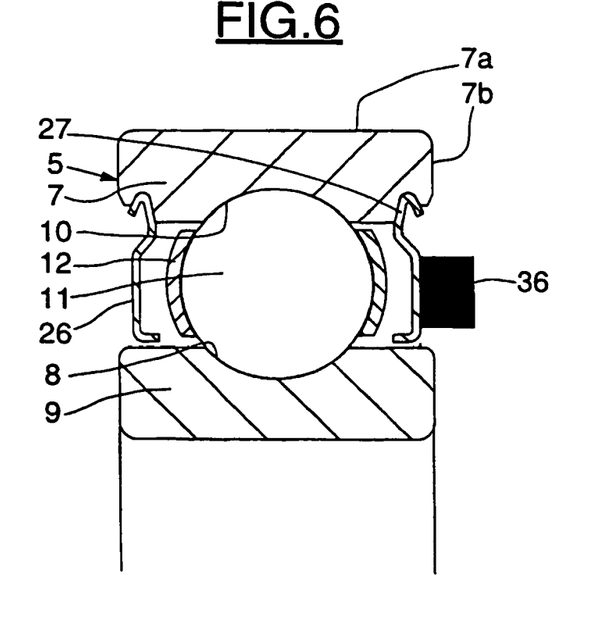
FIG. 6 is an axial sectional view of a bearing according to another embodiment of the invention.

In the embodiment shown in FIG. 6, magnet 36 is bonded directly onto metallic side plate 27 of roller bearing 5 before the roller bearing is placed in wheel 1. The magnetization in combination with the adhesive capacity of the glue is sufficient to fix side plate 27 and magnet 36 together. Magnet 36 also acts as the active part of the encoder element. In other words, the encoder element consists simply of one or several magnets fixed onto side plate 27 by magnetization and gluing. The magnetic characteristics of the magnet provide a means of attachment to the side plate and also a means of generating a signal that the sensor is capable of detecting.

Figure 7:
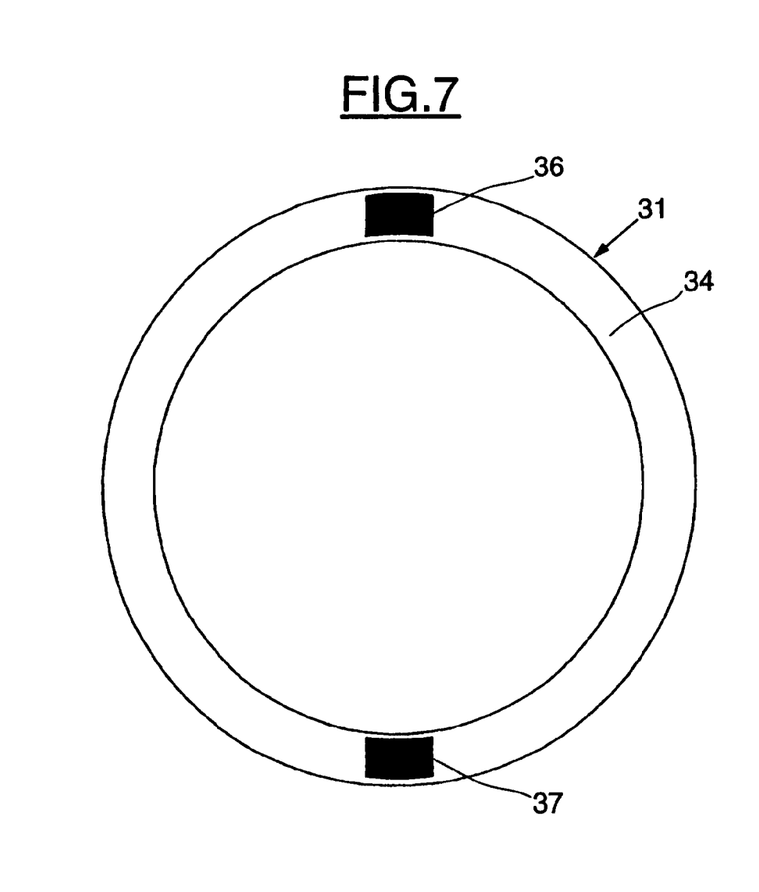
FIG. 7 is an elevation view of an encoder means according to another embodiment of the invention.
Figure 8:
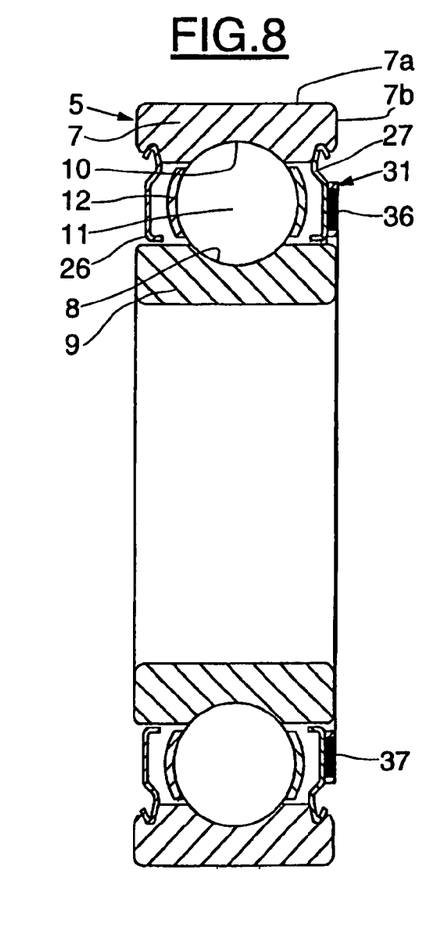
FIG. 8 is an axial sectional view of a bearing fitted with the encoder in FIG. 7.
Figure 9:
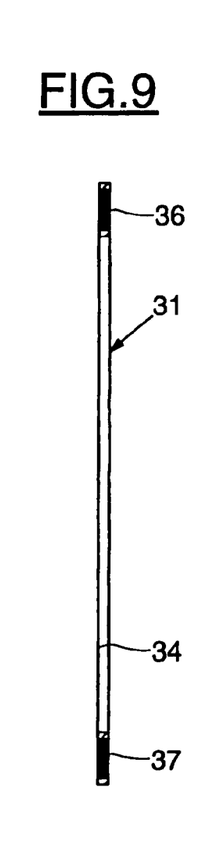
FIG. 9 is an axial sectional view of the encoder in FIG. 7.

In the embodiment shown in FIGS. 7 to 9, encoder element 31 is formed from a thin flexible disk with an adhesive radial face 34 which may be pre-coated with an adhesive. Two magnets 36 and 37 are inserted in the flexible disk. Encoder element 31 is fixed by gluing and magnetization onto the radial portion of sealing side plate 27.

Figure 10:
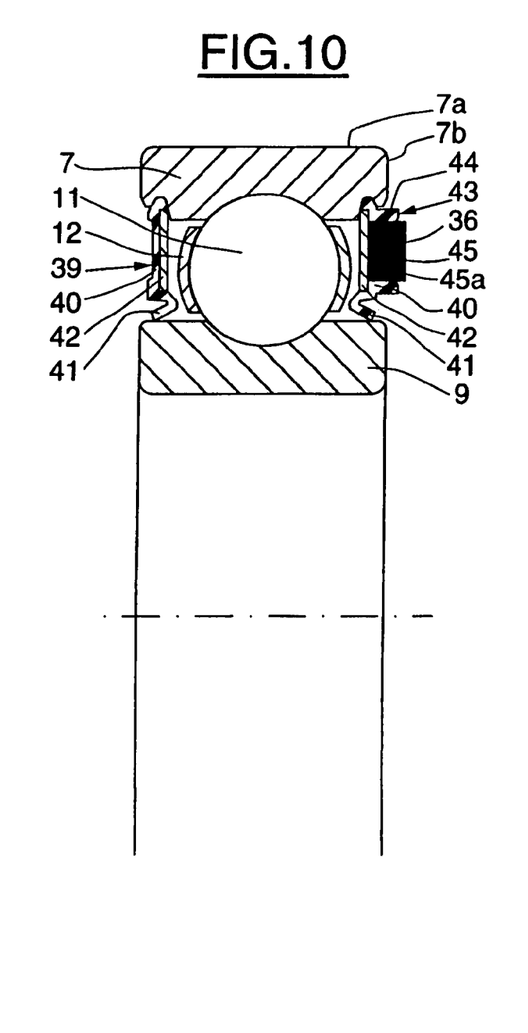
FIG. 10 is an axial sectional view of a bearing according to another embodiment of the invention.
Figure 11:
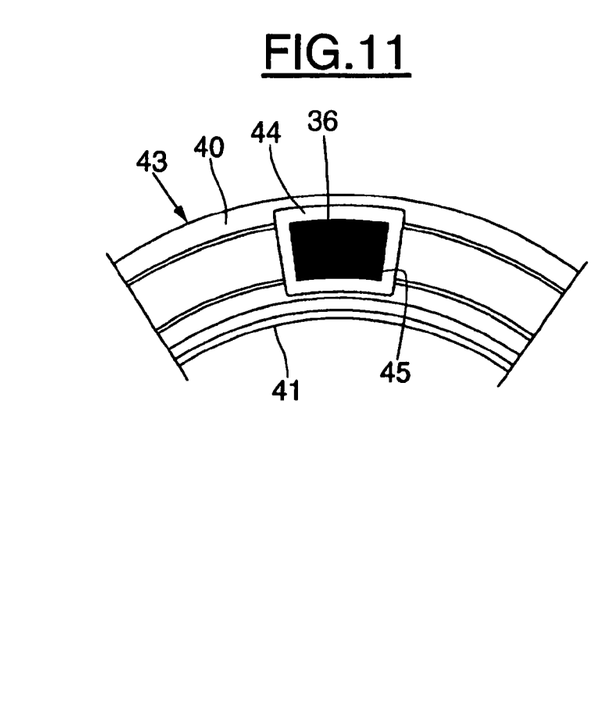
FIG. 11 is a partial front elevation view of the bearing encoder in FIG. 10.

In the embodiment shown in FIGS. 10 and 11, sealing side plate 26 is replaced by an annular friction joint 39 including a flexible part 40, for example made of an elastomer, projecting at one end into the groove in outer ring 7, and at the other end, in this case the inner end, rubbing through a lip seal 41 on an outside cylindrical part of inner ring 9, and an armature or metallic side plate 42, arranged on the same side as rolling elements 11 and fixed to flexible part 40, providing it with the necessary stiffness.

Side plate 27 is replaced by an annular friction seal 43 close to seal 39, except that flexible part 40 has at least one axial protuberance 44 arranged locally and hollowed out in the middle to form compartment 45 open on the outside opposite the rolling elements with the bottom formed by the armature or side plate 42 or by a thin elastomer film bonded to armature 42. Magnet 36 is placed in compartment 45 and is held in place by magnetization with armature 42 that will advantageously be made of a ferro-magnetic material, for example steel plate.

Protuberance 44 and compartment 45 are made by insert moulding of a flexible material on the armature of seal 42 at the same time as the other parts of the seal. Compartment 45 extends locally, occupying a determined annular sector of flexible part 40, at least in the circumferential direction.

Advantageously, a small interference may be provided between magnet 36 and the axial walls 45a of compartment 45 in order to support magnet 36 or to reinforce the support.

As a variant, magnet 36 may also be glued. The position of magnet 36 in the radial and circumferential directions is controlled by compartment 44.

As a variant, it could be envisaged to make the disk from a rigid material or from a magnetizable material, for example plastoferrite. The magnet then forms an integral part of the material forming the disk being made from a part of the said locally magnetized material.

In all embodiments, the device is easy to install in a wheel of a standard in-line skate.

All that is necessary in the embodiments shown in FIGS. 1 to 4 and FIGS. 7 to 9 is to purchase a conversion kit including the magnet holder encoder element and the spacer including a sensor and a transmitter. The next step is to place the encoder element in contact with one of the roller bearings and the spacer between the two roller bearings. The skate is ready to operate by transmitting a signal representing the wheel rotation speed that can be collected and used on a receiver worn like a wristwatch.

In the embodiment shown in FIGS. 5, 6, 10, and 11, a kit including a roller bearing pre-equipped with one or more magnets may be provided. All that has to be done then is to replace one of the roller bearings and install the spacer including a sensor and a transmitter as described above.

In one variant, a device for detection of the rotation speed of a wheel supported by at least one rotating outer ring with at least one roller bearing and at least one non-rotating inner ring having the roller bearing fixed with a spindle mounted on a support includes a non-rotating sensor adjacent to the bearing and a rotating encoder. The encoder is fixed to a support fixed to the rotating ring. The encoder includes at least one magnet extending over part of the support located in the radial and circumferential directions and arranged in the immediate vicinity of a face of the support oriented towards the sensor. The magnet is tightly housed in a compartment of the support such that the clamping force participates in retaining the said encoder in contact with the said side plate. The support may be provided with a method of sealing.

This embodiment is shown in FIGS. 12 to 16, on which the references of elements similar to those in the previous figures have been kept unchanged. This embodiment is similar to the embodiment shown in FIGS. 10 and 11, except that the armature or metallic side plate 42 arranged adjacent to rolling elements 11 has a plane principal part and an outer lip folded slightly towards the plane defined by the center of the rolling elements. Only flexible part 40 is in contact with outer ring 7. Apart from a rim 46 located in the groove of outer ring 7, flexible part 40 includes a double lip seal 47 in rubbing contact with a cylindrical bearing surface of inner ring 9 and a disk-shaped central body 48 mainly formed in a radial direction near the plane principal part of the armature or side plate 42. In other words, the central body 48 extends in the radial direction approximately between the reaming of outer ring 7 and the cylindrical contact surface of inner ring 9.

Figure 12:
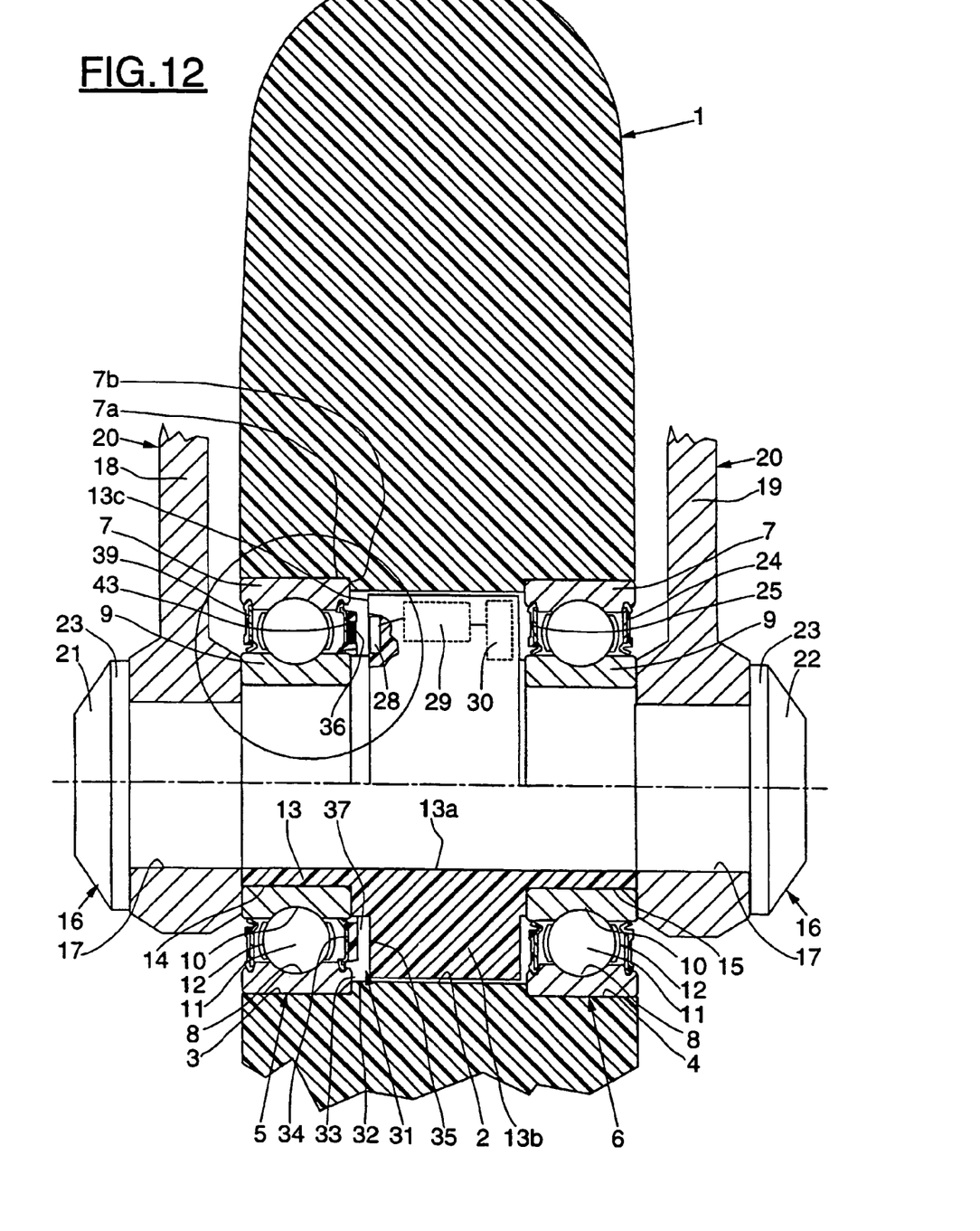
FIG. 12 is an axial sectional view of a wheel of an in-line skate equipped with a detection device according to another embodiment of the invention where the sensor block is shown as an external view in the top part of the figure.
Figure 13:
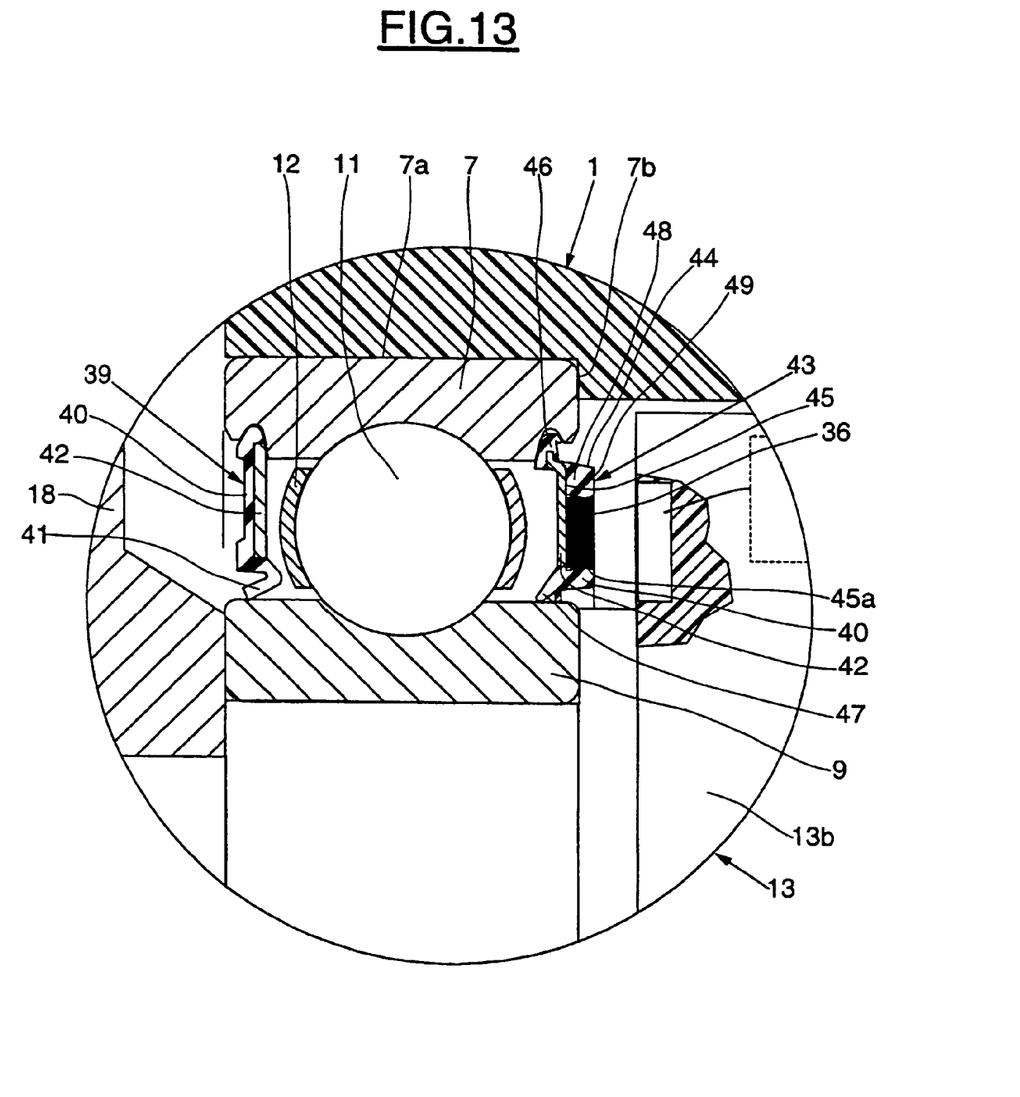
FIG. 13 is a detailed partial view of FIG. 12.

Central body 48 includes plane outer surface 49, usually approximately radial, on the side opposite rolling elements 11. Compartment 45 is formed in central body 48 but in this case is not provided with a protuberance for this purpose. Compartment 45, in this case, goes as far as the armature or side plate 42, which facilitates retaining by magnetization, although this is not essential.

Figure 14:
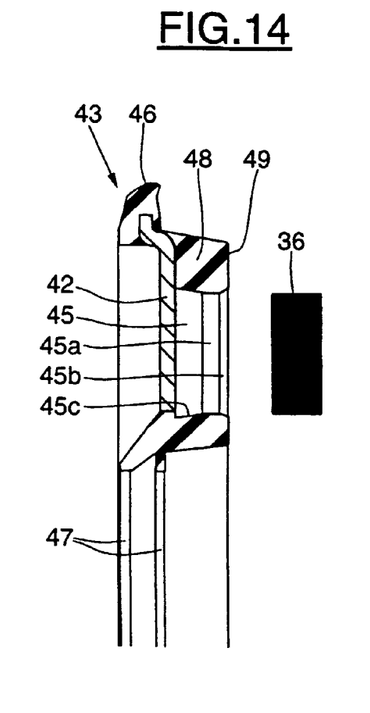
FIG. 14 is a half-axial sectional view of the encoder in FIG. 12 when it is being assembled.
Figure 15:
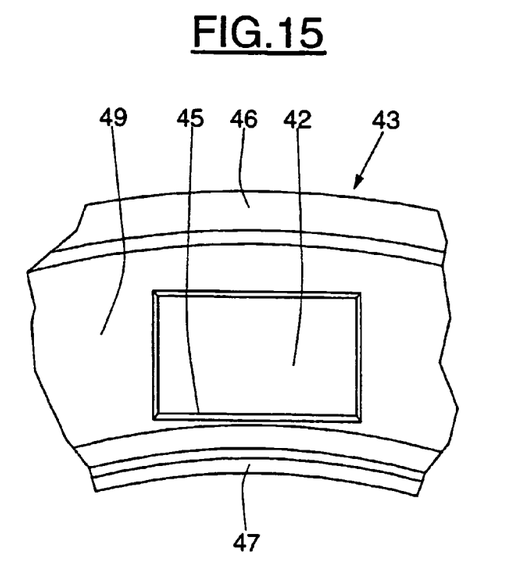
FIG. 15 is a partial front elevation view of the encoder in FIG. 12.
Figure 16:
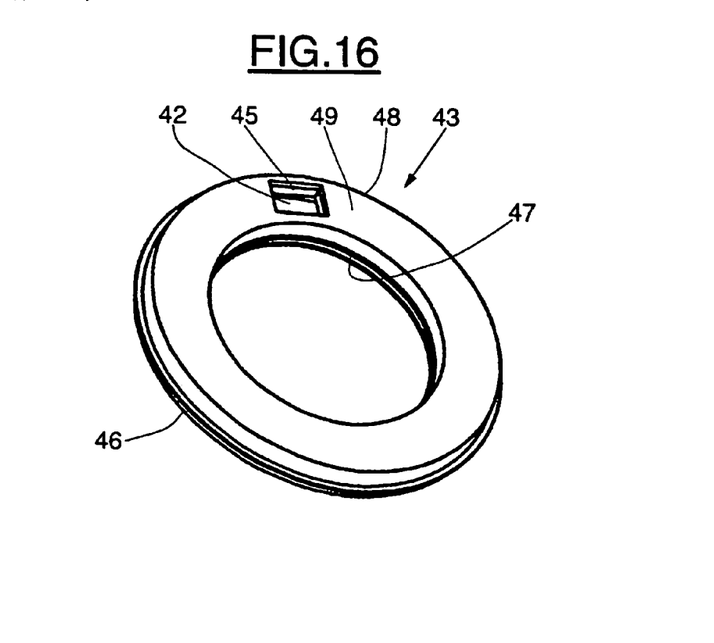
FIG. 16 is a perspective view of the encoder in FIG. 12 before assembly of the magnet.

Rectangular-shaped magnet 36 is placed in compartment 45 and is held there by the walls of the compartment being clamped on the magnet. The said walls are usually perpendicular to a radial plane in their central part 45a. In the free state, magnet 36 is slightly larger than compartment 45 in the radial and/or circumferential direction which maintains sufficient clamping in the installed state to keep the magnet in place. At the entry to the compartment, the walls flare outwards towards the outside of the seal to form an entry chamfer 45b facilitating insertion of magnet 36.

The walls of the compartment are also flared slightly outwards from central part 45a towards armature 42 to form a reverse taper 45c enabling the seal to penetrate freely as far as the bottom of the compartment without any risk of being hindered by the formation of a rubber rim. If the armature or side plate 42 is made of a magnetic material, the magnetic attraction between the magnet and the armature or side plate 42 will also participate in holding the magnet in place. However, it would be possible to envisage the use of an armature or side plate 42 made of a non-magnetic material and particularly a rigid synthetic material.

Magnet 36 is flush with the plane outside surface 49 of central body 48. As a variant, the magnet may be set back slightly from the plane outside surface 49.

The device according to the invention has been illustrated by an application for a skate wheel, but obviously it is applicable to any rotating device for which detection of the angular movement does not necessitate very high precision and can be done on the basis of one or several pulses per revolution. Therefore, the invention is also applicable to skateboard wheels, scooter wheels, or bicycle wheels, and obviously these examples are in no way limiting.

What is claimed is:

1. A device for detecting the rotation speed of a rotating element wherein the rotating element is supported by at least one rotating outer ring, at least one roller bearing, and at least one non-rotating inner ring, wherein at least one non-rotating inner ring is fixed to a spindle installed on a support, the device comprising:
    a non-rotating sensor positioned adjacent to the roller bearing; and
    a rotating encoder, wherein the rotating encoder comprises magnetizable material and wherein the rotating encoder is partially fixed by magnetization to a side plate fixed to at least one rotating outer ring, wherein the side plate comprises an outside face, and wherein the encoder further comprises at least one magnet extending over part of the side plate located in a radial direction and a circumferential direction and arranged in the immediate vicinity of the outside face of the side plate oriented towards the sensor such that the attraction force between the magnet and the side plate participates in retaining the encoder in contact with the side plate.

2. The device of claim 1, wherein the magnet is in contact with the side plate.

3. The device of claim 1, wherein the magnet is bonded to the side plate.

4. The device claim 1, wherein the magnet is embedded in an annular support.

5. The device of claim 4, wherein the annular support is in contact with the side plate.

6. The device of claim 4, wherein the annular support is bonded onto the side plate.

7. The device of claim 4, wherein the annular support is centered on the wheel.

8. The device of claim 4, wherein the annular support is centered on a portion of the side plate.

9. The device of claim 1, wherein the encoder comprises an active encoding part and a magnetic part formed from the same material.

10. The device of claim 1, wherein the magnet is housed in a compartment.

11. The device of claim 10, wherein the compartment is made by insert moulding of a flexible material on the outside face of the side plate.

12. The device of claim 10, wherein the compartment has a parallelepiped shape.

13. The device of claim 10, wherein the walls of the compartment are approximately perpendicular to a radial plane.

14. The device of claim 10, wherein the walls of the compartment comprise a part that flares outwards to form an entry chamfer, a central part acting essentially to retain the magnet, and a reverse tapered part near the bottom of the compartment.

15. The device of claim 10, wherein the magnet is held in place in the compartment partly by a magnetic force and partly by a mechanical force due to clamping in the compartment.

16. The device claim 11 further comprising a disk-shaped element made from a flexible material with an approximately radial outside face of the encoder.

17. The device of claim 16, wherein the magnet is flush with or set back from the outside face of the encoder.

18. The device of claim 16, wherein the disk-shaped element is fixed in a groove in the rotating ring.

19. The device of claim 16, wherein the disk-shaped element comprises an inside edge forming a dynamic seal between the disk-shaped element and the surface of the non-rotating ring, either in friction or with a narrow gap.

20. The device of claim 1, further comprising a sealing lip formed from a flexible material.

21. An encoder for use on a device for detecting the rotation speed of a wheel wherein the wheel is supported by at least one rotating outer ring, at least one roller bearing, and at least one non-rotating inner ring, wherein at least one non-rotating inner ring is fixed to a spindle installed on a support, wherein the device comprises a non-rotating sensor positioned adjacent to the roller bearing, wherein the encoder is partly fixed by magnetization to a side plate comprising magnetizable material, wherein the side plate comprises an outside face, wherein the encoder further comprises at least one magnet extending over part of the side plate located in a radial direction and a circumferential direction and arranged in the immediate vicinity of the outside face of the side plate oriented towards the sensor, such that the attraction force between the magnet and the side plate participates in retaining the encoder in contact with the side plate.

22. The encoder of claim 21, further comprising one or more magnets.

23. A device with rotating wheels comprising:
a device for detecting the rotation speed of a rotating element wherein the rotating element is supported by at least one rotating outer ring, at least one roller bearing, and at least one non-rotating inner ring, wherein the non-rotating inner ring is fixed to a spindle installed on a support, the device comprising:
a non-rotating sensor positioned adjacent to the roller bearing;
and a rotating encoder, wherein the rotating encoder comprises magnetizable material and wherein the rotating encoder is partially fixed by magnetization to a side plate fixed to at least one rotating outer ring, wherein the side plate comprises an outside face, and wherein the encoder further comprises at least one magnet extending over part of the side plate located in a radial direction and a circumferential direction and arranged in the immediate vicinity of the outside face of the side plate oriented towards the sensor, such that the attraction force between the magnet and the side plate participates in retaining the encoder in contact with the side plate.

24. The device with rotating wheels of claim 23, wherein the magnet is in contact with the side plate.

25. The device with rotating wheels of claim 23, wherein the magnet is bonded to the side plate.

26. The device with rotating wheels of claim 23, wherein the magnet is embedded in an annular support.

27. The device with rotating wheels of claim 26, wherein the annular support is in contact with the side plate.

28. The device with rotating wheels of claim 26, wherein the annular support is bonded onto the side plate.

29. The device with rotating wheels of claim 26, wherein the annular support is centered on the wheel.

30. The device with rotating wheels of claim 26, wherein the annular support is centered on a portion of the side plate.

31. The device with rotating wheels of claim 23, wherein the encoder comprises an active encoding part and a magnetic part formed from the same material.

32. The device with rotating wheels of claim 23, wherein the magnet is housed in a compartment.

33. The device with rotating wheels of claim 32, wherein the compartment is made by insert moulding of a flexible material on the outside face of the side plate.

34. The device with rotating wheels of claim 32, wherein the compartment has a parallelepiped shape.

35. The device with rotating wheels of claim 32, wherein the walls of the compartment are approximately perpendicular to a radial plane.

36. The device with rotating wheels of claim 32, wherein the walls of the compartment comprise a part that flares outwards to form an entry chamfer, a central part acting essentially to retain the magnet, and a reverse tapered part near the bottom of the compartment.

37. The device with rotating wheels of claim 32, wherein the magnet is held in place in the compartment partly by a magnetic force and partly by a mechanical force due to clamping in the compartment.

38. The device with rotating wheels of claim 23, further comprising a disk-shaped element made from a flexible material with an approximately radial outside face of the encoder.

39. The device with rotating wheels of claim 38, wherein the magnet is flush with or set back from the outside face of the encoder.

40. The device with rotating wheels of claim 38, wherein the disk-shaped element is fixed in a groove in the rotating ring.

41. The device with rotating wheels of claim 38, wherein the disk-shaped element comprises an inside edge forming a dynamic seal between the disk-shaped element and the surface of the non-rotating ring, either in friction or with a narrow gap.

42. The device with rotating wheels of claim 23, further comprising a sealing lip formed from a flexible material.

* * * * *

UNITED STATES PATENT AND TRADEMARK OFFICE
CERTIFICATE OF CORRECTION

PATENT NO. : 7,033,080 B2  Page 1 of 1
APPLICATION NO. : 10/467404
DATED : April 25, 2006
INVENTOR(S) : Landrieve et al.

It is certified that error appears in the above-identified patent and that said Letters Patent is hereby corrected as shown below:

In the Claims:

Claim 15, col. 9, line 6, please delete "claim 10" and substitute therefor --"claim 1" --.

Claim 16, col. 9, line 10, please delete "claim 11" and substitute therefor --"claim 1" --.

Claim 20, col. 9, line 21, please delete "claim 1" and substitute therefor --"claim 10" --.

Claim 37, col. 10, line 37, please delete "claim 32" and substitute therefor --"claim 23" --.

Claim 42, col. 10, line 56, please delete "claim 23" and substitute therefor --"claim 32" --.

Signed and Sealed this

Eleventh Day of July, 2006

JON W. DUDAS
*Director of the United States Patent and Trademark Office*